Jan. 21, 1969 C. W. OJA ET AL 3,422,929
FLOOR CONTACTING BRAKE MECHANISM
Filed July 31, 1967
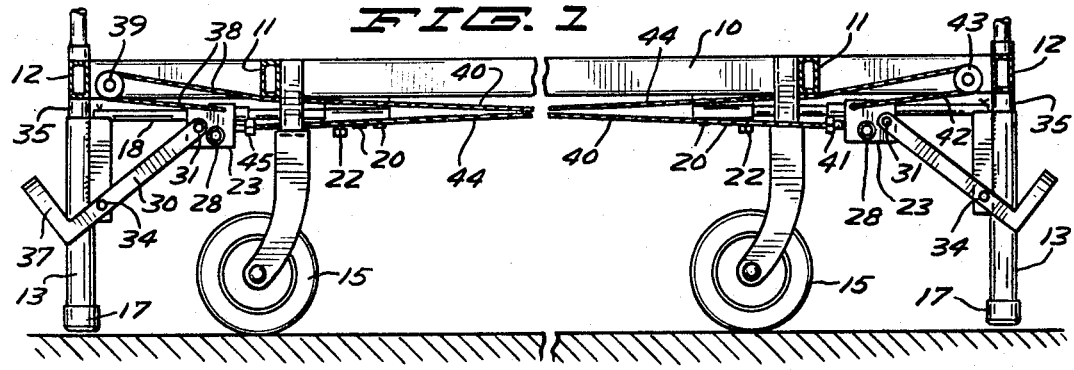
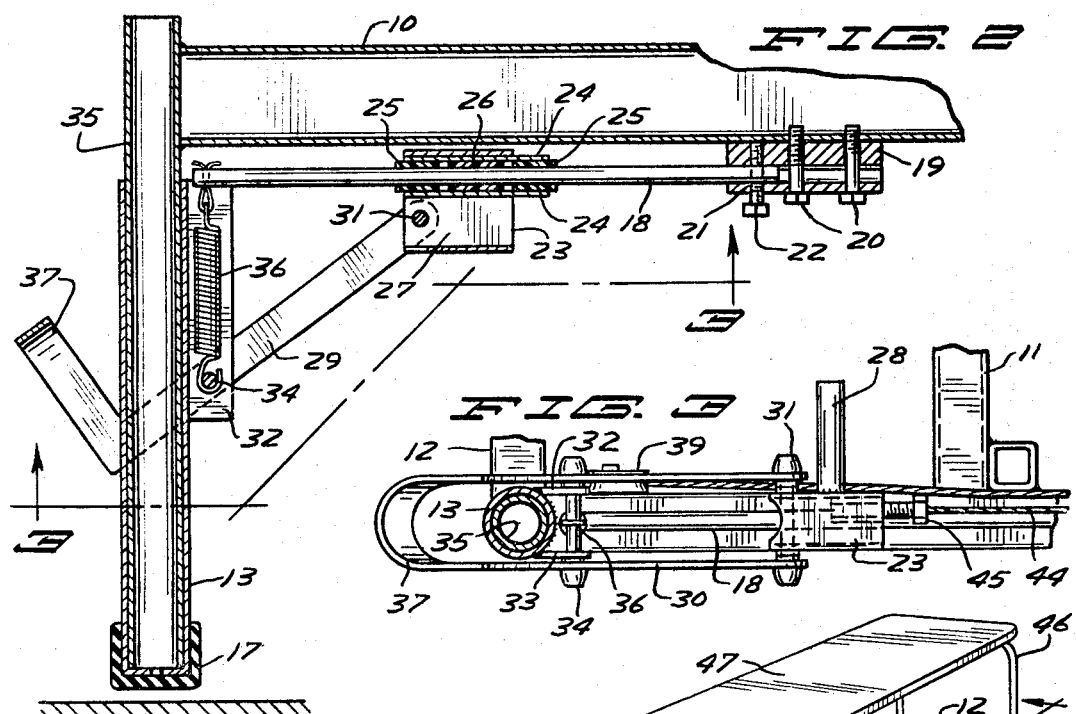
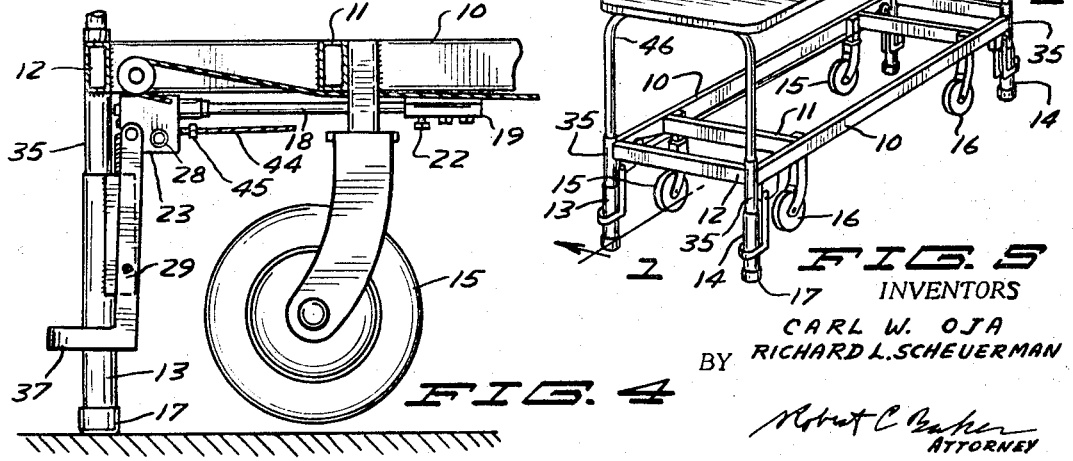
INVENTORS
CARL W. OJA
RICHARD L. SCHEUERMAN
BY
Robert C. Baker
ATTORNEY

United States Patent Office 3,422,929
Patented Jan. 21, 1969

3,422,929
FLOOR CONTACTING BRAKE MECHANISM
Carl W. Oja, St. Paul, Minn. (501 E. South St., Redwood Falls, Minn. 56283), and Richard L. Scheuerman, Inver Grove, Minn.; said Scheuerman, assignor to said Oja
Filed July 31, 1967, Ser. No. 657,397
U.S. Cl. 188—5       8 Claims
Int. Cl. B60t 1/14

ABSTRACT OF THE DISCLOSURE

A brake mechanism is taught for a wheeled mobile assembly, having at least one footed leg element. The brake mechanism has a horizontally oriented linear guide member such as a rod, a slidable bracket carried on that horizontal guide member, a link lever connection between that slidable bracket and a footed leg element of the wheeled mobile assembly, and a spring or other means to bias the footed leg element in retracted condition for wheeled movement of the mobile assembly with the slidable bracket in a position most remote from the footed leg element. Braking is accomplished by moving the slidable bracket toward the footed leg element and thereby causing the footed leg element to extend into braking contact with the floor, or vice versa.

---

This invention relates to a new brake mechanism for wheeled mobile assemblies, and to wheeled mobile assemblies having the new brake mechanism as a part thereof.

The braking mechanism, while useful as a part of many different types of mobile assemblies, is particularly useful as part of a platform carrying wheeled mobile assembly, such as a stretcher or table for carrying or treating hospital patients. An illustrative type of wheeled mobile assembly having a platform, and particularly a platform adjustable in height, on which the brake mechanism of the invention is useful is described and claimed in our United States Patent No. 3,283,832, issued Nov. 8, 1966.

The brake mechanism of this invention is extremely convenient to operate by using one's foot. It may be gently pressed into braking position, or snapped by a slight kick into a release condition, without bending or stooping to accomplish this result. In the preferred embodiment, it reliably brakes wheeled mobile assemblies of which it is a part against movement even when the mobile assembly is on an uneven floor.

Brake mechanisms for wheeled mobile apparatus such as stretchers are old. For example, foot operated brakes mounted directly on caster wheels have been known for years. Each brake mounted directly on a caster wheel, however, must be individually adjusted into braking position; and even after doing so, movement of the mobile assembly is not effectively prevented, particularly when lateral forces are applied to it as when moving a patient on and off of it. The teaching of this invention overcomes these objectionable features and permits one to brake both ends of a stretcher against movement simply by applying foot pressure to one or two elements at one end of the stretcher.

Of course, brake mechanisms capable of being operated by the application of foot pressure or analogous forces at one end of a stretcher have been known heretofore. Unfortunately, however, none are known to be simple in structure and operation. To the contrary, insofar as we are aware, they have been extremely complex and cumbersome, interfering with general appearance of the mobile assembly of which they are a part, and requiring several cumbersome parts and functions in order to perform their objective of braking. The brake mechanism of this invention is not cumbersome. It does not have the objectionable appearance of the prior art cumbersome types; and it is more reliable in use, requiring few if any repairs and only an occasional adjustment after long periods of use.

The new brake mechanism taught herein comprises an essentially-horizontal linear guide member mounted on the mobile assembly, plus an essentially-horizontally slidable bracket mounted to be freely slidable along that linear guide member, and a link lever connection between the slidable bracket and a footed leg element capable of extending into braking contact with a floor, plus means to bias the footed leg element in a retracted condition out of braking contact with the floor. Preferably, the essentially horizontal linear guide member is in the nature of a rod cantilevered toward a footed leg element, but free at its cantilevered end to yield under stress while simultaneously applying force against the direction of the stress applied to it. When the brake mechanism of this invention is in braking position, substantial weight of the mobile assembly of which the brake mechanism is a part is carried by this cantilevered rod; and simultaneously, the cantilevered rod applies force toward the floor and causes the footed leg element to continually contact and even grip the floor even when the weight on the mobile assembly is continually changed.

The invention will be described by reference to a drawing made a part hereof wherein:

FIGURE 1 is a fragmentary and broken sectional view taken on line 1—1 of FIGURE 5, showing a portion of the base part of the mobile assembly in FIGURE 5, but showing that base part with the brakes in released condition as distinguished from the showing in FIGURE 5 where the brakes are in braking position;

FIGURE 2 is a broken cross-sectional view taken on a vertical plane through the elements of apparatus shown at the left in FIGURE 1;

FIGURE 3 is partly in cross section and partly a bottom elevation, and is taken on line 3—3 of FIGURE 2 looking upwardly on the elements of apparatus illustrated in FIGURE 2;

FIGURE 4 is a fragmentary view taken on line 1—1 of the apparatus of FIGURE 5 illustrating the brake mechanism in a braking position; and FIGURE 5 is a schematic perspective view of a mobile wheeled assembly in the nature of an adjustable platformed assembly having brake mechanisms of the invention in braking position.

Referring to the drawing, the wheeled mobile assembly comprises laterally spaced frame members 10, cross bar frame members 11 and 12 (said cross bar frame 12 being unnecessary), one or more footed leg elements 13 and 14 preferably near the corners or near the outermost perimeter portions of the mobile assembly, and casters 15 and 16, suitably four in number and spaced inwardly from the footed leg elements and therefore inwardly of the outermost perimeter portions of the mobile assembly (but suitably spaced so as to support the mobile assembly against tipping). The caster wheels 15 and 16 support the mobile assembly when the footed leg elements (preferably four in number) are in retracted condition out of braking contact with the floor. Each footed leg element 13 and 14 is preferably provided with a friction surfaced floor-contacting end or tip, such as a rubber cap 17. Significantly, each footed leg element 13 and 14 is retractable to the position illustrated in FIGURES 1 and 2, but extensible into braking contact with the floor as illustrated in FIGURES 4 and 5. In the retracted condition, the footed leg elements do not serve to brake movement of the mobile assembly.

Referring to FIGURES 1, 2 and 3, the details for a brake mechanism of the invention will be described. This mechanism comprises an essentially horizontal linear guide member, suitably in the nature of a rod 18. This linear guide member 18 is mounted on the mobile assembly so as to be spaced from the upper portion of the footed leg element 13 with which it is to cooperate. Also it is oriented so as to extend radially outward in an essentially horizontal plane from the footed leg element with which it is to cooperate. Preferably the radial direction in which the linear guide extends is a direction from the footed leg element toward an area under the wheeled mobile assembly, as illustrated. The mounting of this horizontal linear guide member 18 is suitably accomplished by use of a mounting post 19, which is suitably affixed by bolts 20 to a frame member such as frame element 10 of the mobile carriage. The linear guide member in the nature of a rod 18 is suitably held in a recess 21 of the mounting block 19.

Adjustment of the attitude (or essentially horizontal angle) of the linear guide member 18 in a vertical plane is accomplished by use of an abutment member in the nature of a bolt or screw 22 rotatable in threading through the mounting block 19. The abutment member is pressed in abutting condition against the frame member 10 of the mobile assembly to effect the attitude adjustment. Usually, the adjustment is effected with the bolts 20 in loose condition, and then they are tightened.

As illustrated in the drawings, the linear guide member in the nature of a rod 18 is preferably cantilevered out from the mounting block 19 toward a footed leg element. Its extremity nearest the leg element 13 is free to be stressed upwardly or downwardly.

Freely slidable along the linear guide member 18 is an essentially horizontally slidable bracket 23. This bracket cooperatively slides along the horizontal linear guide member. In the form illustrated, it suitably consists of a sleeve member 24, friction reducing bearing inserts suitably of nylon 25 at each end and polytetrafluoroethylene 26 intermediate the nylon terminal bearing portions, and a depending flange or housing 27. To the depending housing 27 of the slidable bracket 23, a handle in the nature of a laterally projecting rod or sleeve element 28 may be affixed, preferably so that it extends laterally inwardly of the perimeter of the mobile assembly of which the brake mechanism is a part.

Pivotally connected to this horizontally slidable bracket is a link lever suitably consisting of two laterally spaced parts or arms 29 and 30. The pivotal connection of this link lever to the slidable bracket is illustrated at 31; and it may suitably consist of a pin extending through the upper extremity of the link lever and the depending flange or housing 27 of the bracket 23. The end of the link lever 29 and 30 opposite its pivotal connection to the slidable bracket 23 is connected to a footed leg element 13, suitably to a flange or flanges 32 and 33 rigidly fixed to the footed leg element and extending inwardly toward the radially extending direction of the horizontal linear guide member or rod 18. Preferably, the connection of the link lever to the footed leg element or the flanges 32 and 33 thereof is a pivotal connection; and this pivotal connection is suitably accomplished through a pin with end caps extending through the link lever 29 and 30 and the flange or flanges 32 and 33 affixed to the leg element, as illustrated at 34 (see FIGURE 3 in particular). It is to be observed that the pivotal connection of the link lever arms 29 and 30 to the slidable bracket 23 is always higher in elevation from the floor than the connection of the link lever 29 and 30 to the footed leg element 13.

The footed leg element 13 is characterized by being retractable from the floor to permit wheeled movement of the mobile assembly and by being extensible into braking contact with the floor to prevent wheeled movement of the mobile assembly. This may be accomplished in various ways, without telescoping while still retaining the preferred vertical slidability as a feature; but a most preferred arrangement of elements, and one which gives excellent results, is that of telescoping the footed leg element 13 over a further leg part 35 rigidly fixed to the frame 10 of the mobile assembly. This permits slidable retraction and slidable extension of the footed leg element 13 along the guide furnished by the leg part 35. The essential feature, however, is the retractability and extensibility of the footed leg element 13 into and out of braking contact with a floor.

As a means to maintain the footed leg element 13 out of braking contact with a floor once the brake is released, a biasing member in the nature of a coil spring 36 suitably is hooked between the pin 34 of the pivotal connection between the link lever and footed leg element on the one hand, and the end of the linear guide member or rod 18 on the other. It is equally suitable, if desired, to attach a spring member to frame 10 instead of the end of rod 18, and to attach the spring member to other parts of the link lever (or for that matter, the slidable bracket) instead of pin assembly 34. Still further, other means to bias the brake mechanism in a retracted condition, such as weights or leaf springs, may be employed. Once the footed leg element is biased in a retracted condition, the slidable bracket 23 is disposed to a retract position at the end of the linear guide member or rod 18 most remote from the footed leg element.

While handle projection 28 may be employed to place the break mechanism in braking position so that the footed leg element is in contact with the floor, it is especially desirable to provide a more conveniently accessible element for performing this function. A pedal conveniently operated by a person's foot is provided by extending the two parts or arms 29 and 30 of the link lever beyond their connection to the footed leg element 13 and in the direction away from the link lever pivotal connection to the slidable bracket 23. This extension of the link lever arms 29 and 30 is suitably continued beyond the footed leg element 13 and at an angle with respect to the link lever so as to provide a crank-like foot pedal 37. A crank-like foot pedal is easily depressed into the position around the footed leg element as illustrated in FIGURE 4 by simply pressing one's foot on it; and the contour of the two parts 29 and 30 of the continuation of the link lever, and the joining of those two parts on the side of the footed leg element opposite the side from which the linear guide member radially extends, provides a foot pedal which does not interfere with, or abut, the footed leg element 13 even in the braking position. Of course, touching may be permitted between the crank-like foot pedal 37 and the footed leg element 13 in the braking position, if desired; but it is conveniently avoided by contouring the crank-like foot pedal 37 as described and illustrated. Alternately a single arm of the link lever (or the link lever may consist of a single arm) may be extended and shaped to provide a foot pedal for use in applying the foot pressure to cause braking.

In operation, as the crank-like foot pedal 37 is depressed from the position illustrated in FIGURES 1, 2 and 3 to the position illustrated in FIGURES 4 and 5, footed leg element 13 is pulled downwardly into braking contact with the floor. Simultaneously, link lever 29 and 30 draws slidable bracket 23 along horizontal linear guide member 18 toward the end of that guide member 18 nearest the footed leg member 13. While this happens, link lever 29 and 30 pivots at its pivot attachment 31 to the slidable bracket 23, and also pivots at its pivot attachment 34 to the bracket or flanges 32 and 33 of the footed leg member 13. Of course, the pivot at pivot point 34 between the link lever 29 and 30 and the footed leg 13 may be discarded in the event the footed leg 13 is made integral or connected rigidly to the link lever, which is an alternate embodiment, not preferred, for the invention.

In the preferred embodiment of the invention, the essentially horizontal linear guide member 18 is in the form of a cantilevered roll off of mounting block 19. This cantilevered rod extends toward a slidably retractable and extensible footed leg element 13. As slidable bracket 23 is drawing toward the cantilevered terminal end of the rod 18 during the braking action, support from the floor on which the foot 17 rests is transmitted upwardly through the slidable footed leg element 13 and then through link lever 29 and 30 to the slidable bracket 23 and then to the cantilevered end of rod 18. If the weight on the mobile assembly is very low, the strength and the resistance of rod 18 to deformation under stress may be sufficient to prevent the rod 18 from being pushed upwardly any significant amount. Under such circumstances, the weight of the frame and other parts of the mobile assembly is transmitted through the mounting post 19 (for the cantilevered rod 18) and then through rod 18, bracket 23, the link lever 29 and 30, and the footed leg element 13, to the floor. On the other hand, if the weight on the mobile assembly is increased, a point is reached where that weight becomes so high that the rod 18 is pushed upwardly. Then rod 18 may be pushed so far upwardly that the slidable bracket 23 (or other elements as part of the bracket) may be pushed upwardly toward the frame 10 of the mobile assembly sufficiently to be placed in direct contact with that frame. Under such circumstances, weight is transmitted from the frame 10 directly through the slidable bracket 23, the link lever and footed leg element, to the floor. The important feature is that the automatic and inherent adjustment of the brake mechanism to maintain the footed leg element 13 in intimate contact with the floor at all times, despite changes in weight, and despite the possibility that some of the extra weight on the mobile assembly may be carried by the caster wheels (which may be forced into contact with the floor as the cantilevered rod 18 bends in yielding to the stresses caused by the extra weight) during the braking of the assembly.

Interestingly, it is not necessary that the forces transmitted from the mobile assembly (or the carriage of it) through the slidable bracket 23 and link lever 29 to the footed leg element 13 be directly in line. As illustrated in FIGURE 4, link lever 29 and 30 may be slightly tilted away from a true perpendicular direction; but as weight is applied, rod 18 is distended upwardly toward the frame 10 of the mobile carriage. This in turn causes the forces from link lever 29 to be transmitted essentially perpendicularly to the rod 18 through the slidable bracket 23, thereby maintaining the slidable bracket 23 in position against slippage along rod 18. In essence, as greater weight is applied to the mobile assembly, the fixation of the braking mechanism in braking position becomes greater because the distention of rod 18 upwardly to a greater and greater extent causes the angle between the link lever (29 and 30) and the rod 18 to become less than the perpendicular (i.e., less than 90°) such that the forces acting to cause movement of bracket 23 along rod 18 tend to push it farther toward the cantilevered end of rod 18 and therefore into—and not out of—braking position. To insure that this result is achieved, the attitude of the guide rod 18 may be adjusted, as aforementioned.

Two or more brake mechanisms of the type discussed, each in association with a footed leg element, may be linked together so that each responds to the action of braking or releasing applied to one. This is suitably accomplished, as illustrated in FIGURE 1, by means of cable connections. For example, a cable may be affixed to housing 23 of the slidable bracket, suitably by knotting the cable 38 in a hole in the housing 23 and then extending the cable 38 in a linear direction toward the end of the essentially horizontal guide member or rod 18 nearest the footed leg element 13. At this point the cable 38 is passed around a pulley 39 and then extended from that pulley toward another brake mechanism. For convenience, the extension of the cabe from pulley 39 to the other brake mechanism in FIGURE 1 is labeled as 40. The cable 40 is then affixed to the slide bracket 23 of the other braking mechanism, suitably by passing the cable 40 through a hollow bolt 41, knotting it, and then threading the bolt in a nut embedded in the housing 27 of the slidable bracket 23. The bolt 41 may then be used to adjust the tension of the cable 40 and its continuation 38. A cooperating or return cable 42 may be affixed to the slidable bracket 23 of the other brake mechanism, extended around pulley 43 and then continued on its way as at 44 to the first braking mechanism, where it is connected to the slidable bracket 23 of the first brake mechanism by using a hollow bolt 45 (such as aforedescribed). These two cables act in combination to cause the two brake mechanisms to respond as one unit. The other side of a stretcher may be similarly equipped so that an operator need only press two foot cranks at one end of the stretcher for complete braking.

In practice, the application of foot pressure on pedal 37 effects braking; and the kicking of handle or rod 28 away from a footed leg element (and toward a direction under the mobile assembly) effectively snaps the brake mechanism into release condition permitting wheeled movement of the mobile assembly.

Several variations from the specific form of apparatus illustrated are possible without departure from the spirit and scope of the invention. An example, in addition to those discussed above, is that of employing a slotted essentially horizontal linear guide member (such as a slot in frame element 10) in combination with a key or other slidable bracket member cooperatively moving in the slot. Another variation, without departing from the invention, is that of enclosing the brake mechanism, or at least the horizontal guide member and the slidable bracket, in a housing, shield or cover. Other variations within the spirit and scope of the invention will readily suggest themselves to these versed in the art of the invention in light of this disclosure.

An especially desirable feature of the preferred embodiment of the invention is that of accomplishing braking while castor wheels 15 and 16 support part of the weight of the mobile assembly. In such cases springy rod 18 yields sufficiently during braking to have the castor wheels on the floor and yet cause the footed legs to grip the floor for braking as well as to compensate for uneven floor surfaces.

That which is claimed is:

1. A brake mechanism for a wheeled mobile assembly having at least one footed leg element retractable for wheeled movement of said assembly over a floor and extensible into braking contact with said floor, said mechanism comprising an essentially horizontal linear guide member mounted on said mobile assembly in spaced radial-extending relationship from said one footed leg element, an essentially horizontally slidable bracket mounted to be freely slidable along said linear guide member from a braking position at the end of said linear guide member toward said footed leg element and to a retract position at the end of said linear guide member most remote from said footed leg element, a link lever connected between said slidable bracket and said one footed leg element, said link lever being pivotally connected at its uppermost end to said slidable bracket, and means to bias said one footed leg element in retracted condition with said slidable bracket in said retract position, said one footed leg element being extensible into braking contact with said floor as said slidable bracket is drawn into braking position toward the end of said linear guide member nearest said one footed leg element.

2. The brake mechanism of claim 1 wherein the essentially horizontal linear guide member mounted on said mobile assembly is cantilevered radially toward said footed leg element and is mounted on said mobile assembly solely at the end thereof most remote from said one footed leg element.

3. The brake mechanism of claim 2 wherein the essentially horizontal linear guide member comprises a rod and wherein the slidable bracket mounted thereon comprises a sleeve encompassing said rod.

4. The brake mechanism of claim 2 wherein the mounting of said essentially horizontal linear guide member is adjustable to permit adjustment of the attitude of said linear guide member in a vertical plane.

5. The brake mechanism of claim 1 wherein the one footed leg element is retractable and extensible slidably in a vertical direction.

6. The brake mechanism of claim 5 wherein the one footed leg element telescopingly cooperates with an upright leg section immovably fixed to said mobile assembly and wherein said telescoping footed leg element is equipped with a flange extending from said leg element toward said essentially horizontal linear guide member, with said link lever pivotally connected to said flange of said one footed leg element, said pivotal connection between said link lever and said flange being located below the plane of the pivotal connection between said slidable bracket and said link lever.

7. The brake mechanism of claim 1 wherein the means to bias the footed leg element in retracted condition comprises a spring member connected between said footed element and the end of said essentially horizontal linear guide member nearest said footed leg element.

8. A wheeled mobile assembly comprising a platform member, four casters supporting said mobile assembly, and four retractable and extensible footed leg elements with a brake mechanism in association with each of said footed leg elements, each of said footed leg elements and said brake mechanisms being such as to satisfy the requirements of claim 1, at least two of said brake mechanisms on one side of said mobile assembly being connected together by cables extending between the slidable bracket portion thereof, such that action on one of the brake mechanisms so connected is effective to cause substantially equal simultaneous action on the other of said brake mechanisms so connected, and means to adjust the length and tension of said cables.

References Cited
UNITED STATES PATENTS 3,288,250  11/1966  Oja et al. _____ 188—5

MILTON BUCHLER, *Primary Examiner.*

T. W. BUCKMAN, *Assistant Examiner.*

U.S. Cl. X.R.

188—23; 280—43.17

UNITED STATES PATENT OFFICE
CERTIFICATE OF CORRECTION

Patent No. 3,422,929 January 21, 1969

Carl W. Oja et al.

It is certified that error appears in the above identified patent and that said Letters Patent are hereby corrected as shown below:

Column 1, line 41, "No. 3,283,832" should read -- No. 3,283,732 --. Column 5, line 3, "roll" should read -- rod --; line 31, "is that the" should read -- is the --.

Signed and sealed this 24th day of March 1970.

(SEAL)
Attest:

Edward M. Fletcher, Jr.  WILLIAM E. SCHUYLER, JR.
Attesting Officer  Commissioner of Patents